May 5, 1931.  O. J. ST. PIERRE  1,804,037
CLUTCH MECHANISM
Filed May 8, 1930  2 Sheets-Sheet 1
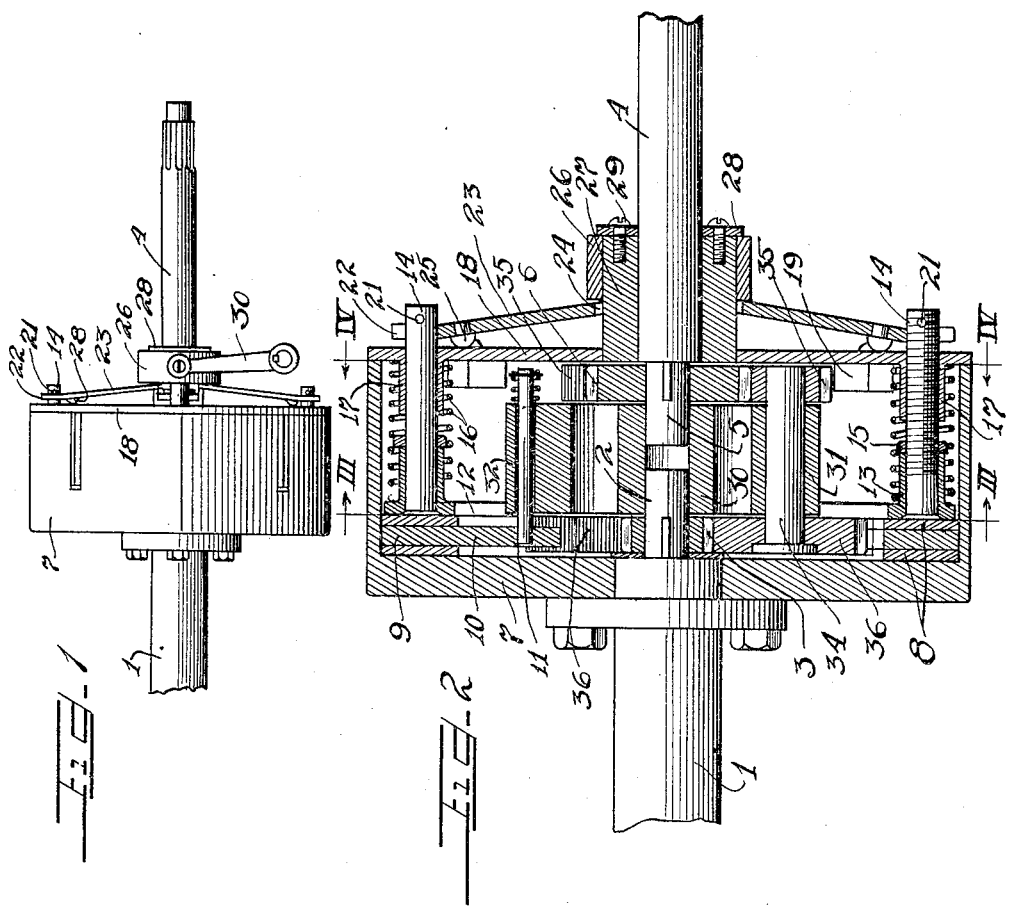
Inventor
Octave J. St. Pierre
by Charles Hill
Attys.

May 5, 1931.   O. J. ST. PIERRE   1,804,037
CLUTCH MECHANISM
Filed May 8, 1930   2 Sheets-Sheet 2
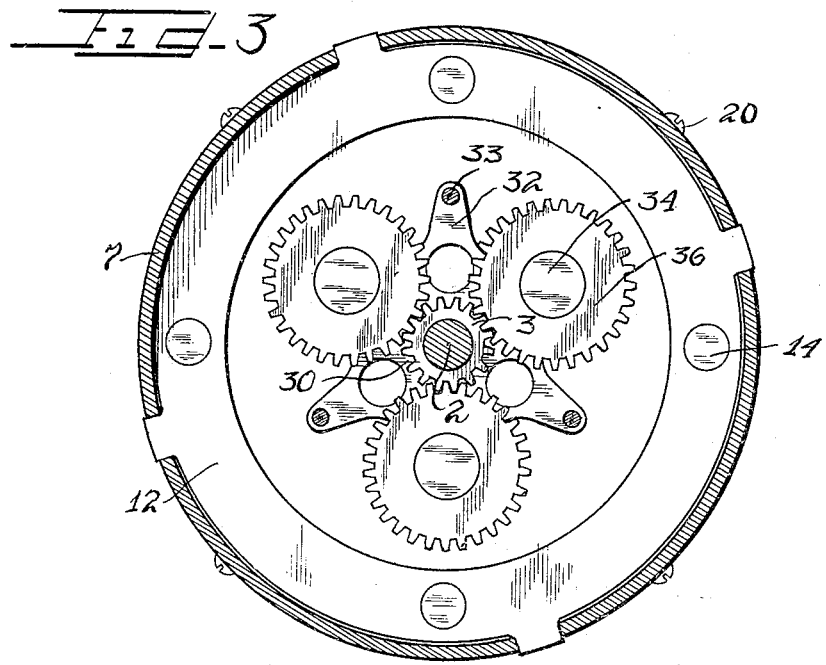
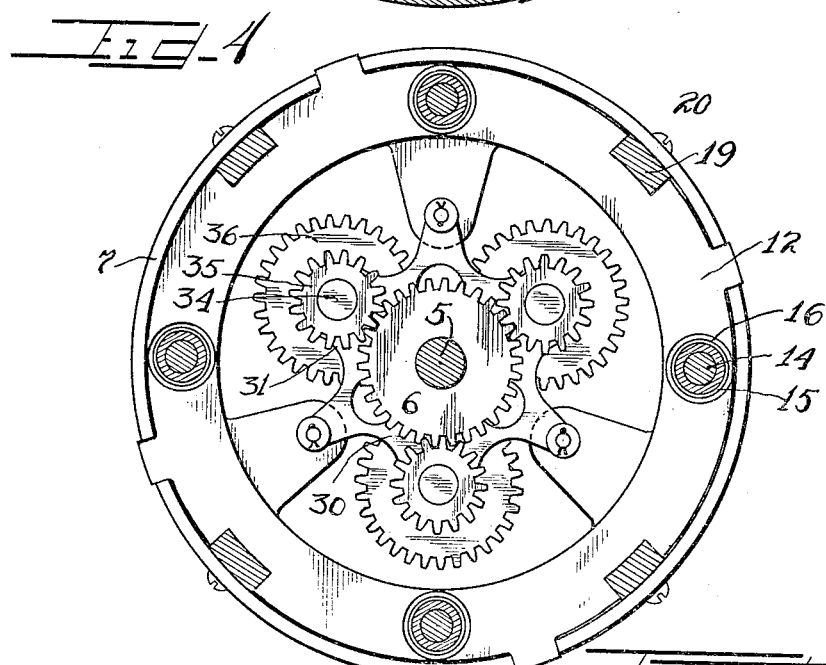
Inventor
Octave J. St. Pierre
by Charles W. Hills
Attys.

Patented May 5, 1931

1,804,037

UNITED STATES PATENT OFFICE

OCTAVE J. ST. PIERRE, OF CHICAGO, ILLINOIS

CLUTCH MECHANISM

Application filed May 8, 1930. Serial No. 450,608.

This invention relates to an improved transmission mechanism of the clutch type for mounting between a driving shaft and a driven shaft for altering the speed ratio of the latter and readily adaptable for use in connection with motor vehicles and the like.

This invention further contemplates the provision of a mechanism of the kind described which operates effectively to facilitate the smooth starting of automotive vehicles and the like which are equipped therewith thereby lessening the strain on both the vehicle and its engine and permitting of a smooth and gradual application of power.

It is an object of this invention to provide an improved type of power transmission mechanism embracing an improved type of clutch mechanism associated with a planetary gear arrangement coacting with gears supported on primary and secondary shafts.

It is an important object of this invention to provide an improved, simplified form of speed-reduction mechanism wherein a spider mounted between a driving and a driven shaft is constructed to support a plurality of gears and is furthermore associated with a friction plate clutch mechanism adapted to be operated to permit relative variable speeds to be transmitted between the driving shaft and its driving gear and a driven gear supported on a driven shaft.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of an improved clutch mechanism embodying the principles of this invention.

Figure 2 is an enlarged longitudinal sectional view of the clutch mechanism, with parts shown in elevation.

Figure 3 is a transverse sectional view of the interior of the mechanism taken on line III—III of Figure 2.

Figure 4 is a transverse sectional view of the interior of the mechanism taken on line IV—IV of Figure 2.

As shown on the drawings:

The reference numeral 1 indicates a driving shaft having a reduced end 2 on which a driving pinion or gear 3 is keyed or otherwise secured. Aligned with the driving or main shaft 1 is an auxiliary or driven shaft 4 having a reduced portion 5 on which a driven gear 6 is keyed or otherwise secured. The driven gear 6 is larger than the driving gear 3.

A housing or casing 7 is secured on the driving shaft 1 and encloses the driving gear 3. Mounted within the housing 7 adjacent the inner face of the end wall thereof are a plurality of clutch friction plates or rings 8 separated by means of an intermediate disc or ring 9 having a plurality of inwardly directed radial arms or tongues 10 integrally formed on the inner periphery thereof, with said arms having apertures or openings 11 provided therein.

Positioned adjacent the innermost clutch friction ring 8 is a clutch retaining disc or ring 12 having integrally formed on one side thereof a plurality of guide sleeves or collars 13. Projecting through the retaining ring 12 and through the sleeves 13 forming a part thereof are a plurality of stub shafts or posts 14 which are rigidly secured to said ring 12 by means of retaining or lock nuts 15 threaded on said posts 14 and adapted to tightly abut against the outer ends of the guide sleeves 13. The clutch retaining ring 12 is resiliently held in contact with the innermost clutch friction ring 8 by means of a plurality of coiled springs 16, the inner ends of which engage around the exterior of the guide sleeves 13 and seat against the retaining rings 12, while the outer portions of the controls springs 16 are engaged around bearing sleeves or collars 17 which are integrally formed at right angles to the inner surface of a housing or casing closure plate or disc 18. The closure plate 18 is provided with a plurality of openings through which the rods or posts 14 slidably project. Integrally formed at spaced intervals on the inner face of the housing closure plate 18 are a plurality of blocks 19 having threaded apertures therein for the reception of retaining screws 20 which project through openings in the peripheral wall of the housing 7 and have the inner threaded ends thereof threaded into the openings in the blocks 19. Engaged through a diametrical slot in each of the posts 14 is a cotter pin 21. Engaged on the outer end of each of the shiftable stub shafts or posts 14 is the bifurcated or forked end 22 of a radially positioned bar lever 23, the inner end of which is provided with an arcuate notch 24.

Engaged on each of the lever bars 23 is a stop member 25 which is disposed slightly to the inside of the forked end 22 of the lever bar and affords a pivot or fulcrum point which contacts the outer surface of the housing closure plate 18 and permits pivotal movement of the respective bar levers. The coiled springs 16 normally act to hold the slidable posts 14 in their innermost position, thereby holding the cotter pin 21 in resilient contact with the forked ends 22 of the bar levers 23, so that the pivots or stop members 25 of said levers are held in contact with the closure plate 18 of the housing, thereby holding the inner ends of said bar levers 23 projected outwardly, as illustrated in Figure 2, in resilient contact against a stop collar 26. The stop collar 26 is in the form of a control collar which is shiftably mounted on a hub or bearing sleeve 27 which is rigidly secured or formed at right angles to the middle or center of the housing closure plate 18. Engaged on the outer end of the hub 27 is a stop ring 28 which is held in position by means of retaining screws 29 or other suitable means and serve as a stop means for limiting the outward movement of the clutch ring or collar 26.

Pivotally engaged on the clutch collar 26 is a clutch-actuating fork 30 adapted to be connected with a foot pedal or any other suitable mechanism whereby the clutch mechanism may be actuated.

Normally, the clutch control springs 16, acting on the clutch retaining ring 12, frictionally compress the clutch rings 8 and 9, holding the same in frictional engagement with one another and against the end wall of the clutch housing 7.

With the clutch control posts 14 held in their innermost position, as illustrated in Figure 2, the clutch operating bars 23, which are pivotally supported by the fulcrumed head 25 against the housing closure plate 18, have their inner ends held in their outermost position against the clutch collar or ring 26, holding the clutch collar in contact with the stop plate 28 mounted on the end of the hub 27.

Rotatably mounted within the housing 7 upon the adjacent ends of the reduced portions 2 and 5 of the driving shaft 1 and the driven shaft 4, respectively, is a planetary gear unit comprising a rotatable spider 30 provided with a plurality of integral, radially directed bearing arms 31 alternating or staggered with respect to a plurality of rigidly directed arms or spokes 32, each of which has engaged therethrough a pin 33. The ends of the pins 33 on one side of the spider 30 are positioned to project loosely into the apertures 11 provided in the arms 10 of the clutch ring 9.

Rotatably journalled or engaged through each of the spider bearing arms 31 is a stub shaft 34, on one projecting end of which is a small gear or pinion 35 rigidly keyed or otherwise secured. Engaged on the opposite end of each of the stub shafts 34 is a larger gear 36. The group of planetary gears 36 are positioned on one side of the spider wheel 30 and are in mesh with the driving gear 3 on the driving shaft 1. The group of small planetary gears or pinions 35 are positioned on the opposite side of the spider wheel 30 and are in mesh with the driven gear 6 keyed on the reduced portion 5 of the driven shaft 4.

The ratio of the drive transmitted by the driving shaft 1 is such that the power is first transmitted by the driving gear 3 to the planetary gears 36 and 35 at a predetermined reduction, depending upon the relative sizes of the gears 3 and 36, so that, normally, with the clutch plates released, the gear-carrying spider unit within the housing 7 is permitted to rotate at a reduced rate of speed within the housing and in a direction opposite from the direction of rotation of said housing. By proper adjustment of the clutch mechanism, the driven shaft 4 may be rotated at various rates of speed from nothing up to a direct drive from the driving shaft 1 by an adjustment of the clutch control mechanism.

Normally, the clutch collar 26 is moved inwardly from the position illustrated in Figure 2 by means of a clutch control lever or foot pedal, as the case may be, toward the closure plate 18 of the clutch housing 7, thereby causing the inner ends of the fulcrumed radial bars 23 to be moved inwardly toward the closure plate 18, causing the forked upper ends 22 of said bars to swing outwardly, thereby pulling the stub shafts or posts 14 outwardly, compressing the control springs 16 and releasing the pressure on the clutch friction ring members 8 and 9. In this position of adjustment of the parts, the driving shaft 1 rotates the driving gear 3 which, in turn, rotates the gears 36 and the smaller gears 35. The gears 35 and 36, being mounted on the stub shafts 34, rotate at the same rate of speed. The spider wheel 30 is free to move and rotate on the reduced ends 2 and 5 of the shafts 1 and 4, respectively, so that the gears 35 will idly roll over or travel around the driven gear 6 without rotating said gear or the driven shaft 4 on which it is supported. Rotation of the spider 30 within the housing 7 causes the pins 33, carried by said spider, to rotate the intermediate clutch ring 9.

When the clutch control pedal or lever governing the operation of the clutch collar 26 is in its normal position, the clutch control springs 16 are compressed and the clutch retaining ring 12 is held in a released position, releasing the pressure on the clutch plates or rings 8 and 9. When the clutch control pedal or lever is operated to move the clutch collar 26 outwardly toward the position illustrated in Figure 2, the control springs 16 are gradually released and the retaining ring 12 is gradually moved toward the clutch plates 8 and 9, thereby gradually increasing the frictional pressure therebetween, gradually reducing the relative rotation of the spider wheel 30 until the same is locked with respect to the rotatable housing 7, in which case a direct drive from the driving shaft 1 is imparted to the driven shaft 4. Different positions of adjustment may thus be obtained by regulating the operation of the clutch mechanism within the housing 7. When the clutch mechanism is released, the driving gear 3, turning with the driving shaft 1, drives the gears 36 and 35. The driven gear 6 mounted on the driven shaft 4 is adapted to be held against rotation by the load, and the planetary gears 35 will travel around the gear 6 in a direction opposite from that in which the driving shaft 1 is turning. In this manner, the spider wheel 30 and the gears 36 and 35 carried thereby will rotate in a reverse direction to the movement of the driving shaft 1 and the driving gear 3 mounted thereon. When this operation takes place, the driven gear 6 and the driven shaft 4 will not be rotated.

In intermediate positions of the clutch mechanism, the relative frictional engagement between the clutch rings or plates act to gradually resist the turning movement of the spider wheel 30 in proportion to the resistance caused by the retarding rotation of the spider wheel and the power from the driven shaft is brought to be imparted gradually to the driven gear 6 and the driven shaft 4. With the frictional engagement between the clutch rings 8 and 9 being increased, a point will be reached wherein the friction between the clutch rings will be sufficient to prevent the counter revolving movement of the spider wheel 30 within the housing 7, but will not be sufficient to rotate the spider wheel 30 forward or in the same direction as the movement of the housing 7. When such a point in the operation is reached, the spider wheel 30 will stand still, so that the power transmitted from the driving shaft 1 to the driven shaft 4 will be at a reduction directly proportional to the ratio of the driving gear 3 to the driven planetary gears 36.

When the clutch is fully engaged, as illustrated in Figure 2 of the drawings, the spider wheel 30 is locked to and rotates with the driving shaft 1, so that the planetary gears 36 and 35 are also locked against rotation with respect to the driving gear 3 and the driven gear 6. In this condition of adjustment of the various parts, the driving shaft and the driven shaft 4 rotate together.

While the embodiment of my invention shown in the accompanying drawings provides for a reduction in speed between the driving and driven shafts, I also propose to reverse the relative positions of the gears and spider to secure a speed increase, such embodiment being fully within the contemplation of my invention.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a clutch mechanism, the combination with a driving shaft and a driven shaft, of gear mechanisms connected with said shafts, a spider rotatably mounted on said shafts between the gear mechanisms and affording support for a plurality of said gears, a friction plate clutch mechanism, apertured arms on one of the clutch friction plates, pins carried by said spider and engaged through said friction plate arms, a spring-controlled governing means for regulating the frictional pressure between the clutch plates, and a plurality of fulcrumed members connected with said spring-controlled governing means for actuating the same to permit varying relative speeds to be transmitted from the driving shaft to said driven shaft.

2. A transmission mechanism comprising a driving shaft, a driven shaft in alignment therewith, a housing rigidly secured to said driving shaft, a driving gear secured to said driving shaft within said housing, a driven gear secured to said driven shaft within said housing, a spider wheel rotatably mounted on said shafts within said housing, a plurality of sets of gears rotatably supported on said spider wheel and coacting with said driving gear and said driven gear, a plurality of clutch friction rings mounted within said housing, an intermediate clutch friction ring within said housing disposed between said clutch friction rings, apertured arms integrally formed on said intermediate clutch friction rings, a plurality of pins carried by said spider wheel and projecting into the apertures provided in said arms, a clutch control ring mounted in said housing, a plurality of posts rigidly secured thereto and slidably projecting out of said housing, control springs engaged on said posts within said housing, a shiftable clutch collar, means for actuating the same, and a plurality of fulcrumed control members engaged on the exterior of said housing and connected between said clutch collar and the outer projecting ends of said posts.

3. A transmission mechanism comprising a pair of aligned shafts, groups of planetary gears connected with said shafts, a spider rotatably mounted on said shafts between said groups of planetary gears, a plurality of pins carried by said spider, a friction plate clutch mechanism having one of the plates thereof apertured to receive said pins, a spring-controlled ring for adjusting said friction plate clutch mechanism.

4. In a transmission mechanism, the combination with a driving shaft and a driven shaft, of a plurality of gear mechanisms coacting with said shafts, a spider wheel rotatably mounted on said shafts between said gear mechanisms, a spring-controlled friction plate clutch mechanism, pin members supported by said spider wheel and connected with one of the members of said clutch mechanism, a spring-controlled ring for regulating the pressure between the plates of said clutch mechanism, and fulcrumed control members connected to operate said rings.

5. In a transmission mechanism, the combination with a driving shaft and a driven shaft, a housing secured to said driving shaft, a driving gear on said driving shaft within said housing, a driven gear on said driven shaft within said housing, a wheel member rotatably mounted on said shafts within said housing between the driving gear and said driven gear, a plurality of stub shafts journalled in said wheel, gears mounted on both ends of said stub shafts in mesh with said driving gear and with said driven gear, a friction plate clutch mechanism within said housing, spring controlled pins connecting said clutch mechanism with said wheel, and a spring-controlled friction member for regulating the friction between the plates of said clutch mechanism.

6. The combination with a driving shaft and a driven shaft, of a planetary gear mechanism connecting said shafts, a friction plate clutch mechanism, interfitting members connecting said friction plate clutch mechanism with said planetary gear mechanism, a spring-controlled ring for regulating the friction between the plates of said clutch mechanism, fulcrumed members connected with said spring-controlled ring, and a control mechanism for operating said fulcrumed members.

7. In a transmission mechanism of the class described, the combination with a driving shaft and a driven shaft, of a planetary gear mechanism connecting said shafts, a plurality of adjacently positioned friction clutch rings, a plurality of inwardly directed radial arms integrally formed on one of said clutch rings, members carried by said planetary gear mechanism connected to said arms, a friction control ring mounted adjacent said friction clutch rings, a housing connected to the driving shaft and enclosing the planetary gear mechanism and said clutch rings, a plurality of posts rigidly secured to said control ring and projecting outwardly from said housing, control springs engaged on said posts within said housing, a plurality of fulcrumed members engaged on the exterior of said housing and connected with the projecting ends of said posts, a shiftable clutch collar coacting with the inner ends of said fulcrumed members, and means for operating said clutch collar.

In testimony whereof I have hereunto subscribed my name at Chicago, Cook County, Illinois.

OCTAVE J. ST. PIERRE.